United States Patent [19]

Laurenz

[11] 4,280,447

[45] Jul. 28, 1981

[54] ANIMAL FACILITY EQUIPMENT

[75] Inventor: Frank R. Laurenz, Eagle Butte, S. Dak.

[73] Assignee: Agricultural Research & Development Inc., Eagle Butte, S. Dak.

[21] Appl. No.: 123,839

[22] Filed: Feb. 22, 1980

[51] Int. Cl.³ .................... A01K 1/00; B65G 25/08
[52] U.S. Cl. ............................................. 119/28
[58] Field of Search ..................... 119/28, 20, 15; 198/224

[56] References Cited

U.S. PATENT DOCUMENTS 3,827,402  8/1974  Laurenz ..................... 119/28 X
3,960,110  6/1976  Laurenz ..................... 119/28

Primary Examiner—Hugh R. Chamblee
Attorney, Agent, or Firm—Larson and Taylor

[57] ABSTRACT

A manure scraper moves along an alleyway divided into sections by a plurality of gates or partitions and as the scraper passes under each partition, a wire brush or the like attached to the gate but insulated therefrom, engages the upper surface and electrifies the scraper so that an animal touching or being engaged by the scraper, receives an electric shock. The wire brush is connected to a shocking transformer which in turn is connected to a source of electrical energy.

20 Claims, 5 Drawing Figures

U.S. Patent  Jul. 28, 1981  4,280,447
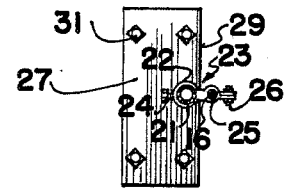
FIG. 4
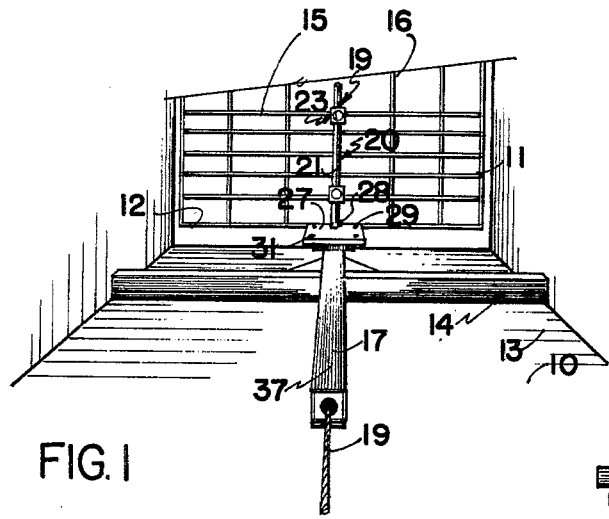
FIG. 1
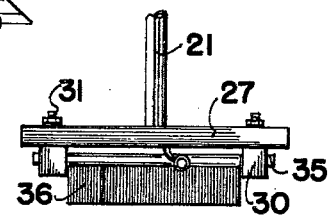
FIG. 3
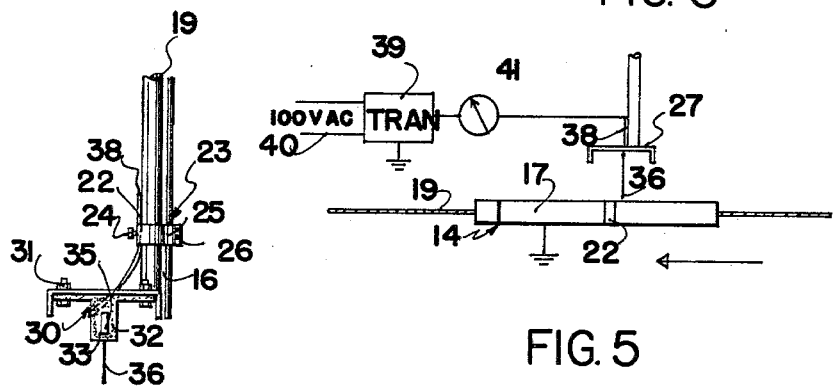
FIG. 2
FIG. 5

ANIMAL FACILITY EQUIPMENT

BACKGROUND OF THE INVENTION

This invention relates to new and useful improvements in animal facilities, and in particular to facilities having a movable assembly such as a manure or dung scraper as described and illustrated in my U.S. Pat. No. 3,960,110 dated June 1, 1976.

In that patent, is illustrated an animal facility having an automatically movable assembly compising a scraper for removing dung. It is shown adapted to be used in an alleyway between opposing pairs of farrowing stalls or the like with the alleyway being divided by one or more partitions, into sections.

The teachings of this patent and the present invention are useful in a variety of animal facilities for cattle, pigs and other animals, especially free stall animal facilities in which the animal is free to leave the farrowing stall for eating, drinking, exercising and dunging, suitably in an alleyway near the stall.

The above mentioned patent shows means for automatically reversing the scraper if an obstruction is engaged by the scraper and it also includes an electrode which is seucred to the scraper. This electrode is charged only when an animal obstructs the scraper by putting pressure on same which allows the animals to play with the scraper, throwing it off track unless sufficient pressure is exerted opposite to the direction of movement which then activates the electrode. The current is carried to the scraper by a cable which normally lies in the wet gutter adjacent the alleyway and is therefore limited to approximately 100 ft. because of loss of shocking current.

The present invention overcomes disadvantages inherent in existing equipment inasmuch as it is not limited by the length of the gutter and the shock is introduced into the scraper only as it travels under the partitions or gates when moving from pen to pen.

There is no indiscriminate punishment as animals are exposed to shock only as the scraper travels through their pens and the scraper may be charged with a slight electrical shock while carrying the manure and eliminates animals from playing with the scraper as it is performing its cleaning function.

In accordance with the invention there is provided in an animal facility having a moving facility such as a manure scraper assembly, moving along an alleyway having at least one partition across the alleyway, said moving facility passing under the partition and includes a longitudinally extending, elongated, electrically conducting member extending forwardly and rearwardly thereof; and a source of electrical energy; the improvement comprising means to electrify the moving facility only as the elongated member passes under the partition, said means including a mounting support securable to said partition, current carrying means engaging the elongated member of the moving facility as it passes under the partition, means mounting said current carrying means to said mounting support and electrically insulated therefrom and means operatively connecting said current carrying means to the source of electrical energy.

Another aspect of the invention consists of an animal facility including an alleyway and at least one partition across said alleyway with the lower end thereof spaced above the floor of said alleyway, a manure scraper movable along said alleyway and under said partition and a source of electrical energy, means to electrify the manure scraper as it passes underneath the partition, said means including a mounting support securable to said partition, current carrying means engaging the manure scraper as it passes under the partition, means mounting said current carrying means to said mounting support and electrically insulated therefrom and means operatively connecting said current carrying means to the source of electrical energy.

A further advantage of the invention is to provide a device of the character herewithin described which is simple in construction, economical in manufacture and otherwise well suited to the purpose from which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a fragmentary partially schematic isometric view of a scraper assembly passing under a partition to which the invention is secured.

FIG. 2 is an end view of the invention shown attached to a vertical member of the partition.

FIG. 3 is a front elevation of the invention per se.

FIG. 4 is a top plan view of FIG. 2.

FIG. 5 is a schematic electrical diagram of the invention.

In the drawings like characters of reference indicate corresponding parts in the different figures.

DETAILED DESCRIPTION

Proceeding therefrom to describe the invention in detail, reference character 10 illustrates an alleyway between adjacent pens (not illustrated), said alleyway having at least one vertically situated partition 11, spanning same and dividing the alleyway into one or more sections.

The partition is usually in the form of a wire mesh-type gate which can be opened or closed as desired and includes a lower horizontal member 12 spaced above the floor 13 of the alleyway in order to allow a manure scraper such as illustrated in general by reference character 14, to be pulled along the alleyway and under the partition 11 in order to remove manure and the like from the alleyway.

Normally the gate consists of a plurality of horizontal spaced and parallel members 15 and a plurality of vertical spaced and parallel members 16.

The scraper includes the electrically conducting longitudinally extending main bar or elongated member 17 with transversely extending scraper blades 18 extending upon either side of the member 17 and being pulled from end to end by means of a cable 19 in a conventional manner.

It is desirable to electrify the scraper with a shocking current particularly as it is passing under the partitions 11 because this is the danger area. If an animal is lying down between adjacent partitions then there is time for the animal to get out of the way of the scraper when the animal is engaged by the scraper. In any event there is usually a reversing mechanism on the scraper which is actuated when resistance builds up beyond a certain amount as illustrated in my U.S. Pat. No. 3,960,110.

However, the danger areas are one or two feet on either side of the partition when the animal can become damaged before the scraper can be automatically actuated to reverse.

The invention collectively designated 19 is adapted to electrify the scraper only as it passes below the partitions and it includes a mounting support collectively designated 20 which, in this embodiment, includes a vertically situated pipe or tube 21 clamped within the front portion 22 of a bracket assembly collectively designated 23, by means of clamp bolts 24 extending through the wall of the clamp 22 and engaging the tube or rod 21. This allows vertical adjustment of the tube or rod together with the current carrying portion which is secured to the lower end thereof as will hereinafter be described.

The clamps 23 also include a split rear clamp portion 25 engageable around one of the vertical members 16 of the partition and clamped into position by means of nut and bolt assemblies 26. However, other methods of securing the clamps to the partitions may of course be used.

A mounting plate 27 comprises a transversely extending inverted channel which is secured to the lower end of the rod or tube 21 as by welding 28 and this rod or tube is secured adjacent the rear edge 29 of the channel.

A pair of spaced and parallel insulating blocks collectively designated 30 are secured in spaced apart relation to the underside of the channel and next therein, said blocks being secured to the channel by means of nut and bolt assemblies 31 as shown in FIG. 2.

Slots 32 are formed through the vertical portions 33 of the blocks 30, said blocks being T-shaped when viewed in end elevation.

A current carrying assembly collectively designated 34 is provided comprising a cross bar 35 which engages through the slots 32 in the blocks 30 as clearly shown in the drawings, said bar having scraper contacting means secured thereto and depending downwardly therefrom. The preferred embodiment includes a plurality of bristles 36 made of an electrical conducting material such as steel wire. These are secured to the strip 35 and depend downwardly therefrom in the form of a closely spaced wire brush which engages the upper surface 37 of the member 17 of the scraper assembly as the scraper assembly passes under the lower side 12 of the partition.

A current carrying wire 38 is secured to the cross bar 35 and is connected to a shocking transformer 39 which in turn is connected to a source of electrical energy as indicated at 40. An adjustment 41 may be provided in order to control the intensity of the shocking current present in the wire brush 30 and hence in the scraper as it passes therebelow.

Other current carrying means can be used including for example, a spring loaded roller, a solid metal plate or the like.

If an animal touches the scraper while it is passing under the partition, it immediately receives a shock which will cause the animal to remove itself from the vicinity of the scraper. This prevents damage occurring to the scraper or to the animal and the intensity of the shock can, of course, be controlled by the adjustment 41.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In an animal facility having a moving facility such as a manure scraper assembly, moving along an alleyway having at least one partition across the alleyway, said moving facility passing under the partition and having a longitudinally extending, elongated, electrically conducting member extending forwardly and rearwardly thereof; and a source of electrical energy; the improvement comprising means to electrify the moving facility only as the elongated member passes under the partition, said means including a mounting support securable to said partition, current carrying means engaging the elongated member of the moving facility as it passes under the partition, means mounting said current carrying means to said mounting support and electrically insulated therefrom and means operatively connecting said current carrying means to the source of electrical energy.

2. The device according to claim 1 in which said mounting support includes a mounting plate and means securing said mounting plate upon the partition for vertical adjustment relative thereto.

3. The device according to claim 2 in which said last mentioned means includes a vertically situated rod, clamp means engaging said rod and said partition, said rod being movable vertically within said clamp means.

4. The device according to claim 1 in which said current carrying means comprises a current carrying brush engaging the upper surface of the moving facility as it passes below the partition.

5. The device according to claim 2 in which said current carrying means comprises a current carrying brush engaging the upper surface of the moving facility as it passes below the partition.

6. The device according to claim 3 in which said current carrying means comprises a current carrying brush engaging the upper surface of the moving facility as it passes below the partition.

7. The device according to claim 4 which includes a pair of insulating blocks secured to said mounting plate, said brush including a horizontally situated bar, the ends of said bar engaging and being supported by said block, and electrically conducting wire bristles extending downwardly from said bar, and an electrical conductor operatively connected between the source of electrical energy and said bar.

8. The device according to claim 5 which includes a pair of insulating blocks secured to said mounting plate, said brush including a horizontally situated bar, the ends of said bar engaging and being supported by said block, and electrically conducting wire bristles extending downwardly from said bar, and an electrical conductor operatively connected between the source of electrical energy and said bar.

9. The device according to claim 6 which includes a pair of insulating blocks secured to said mounting plate, said brush including a horizontally situated bar, the ends of said bar engaging and being supported by said block, and electrically conducting wire bristles extending downwardly from said bar, and an electrical conductor operatively connected between the source of electrical energy and said bar.

10. The device according to claims 7, 8 or 9 in which said mounting plate comprises an inverted channel member, said blocks each comprising a substantially T-shaped member when viewed in end elevation with the upper horizontal portion thereof nesting within said channel and being secured therein, said blocks being secured in spaced relationship one from the other, the vertical portion of said T-shaped members being apertured to receive the ends of said bar of said brush.

11. An animal facility including an alleyway and at least one partition across said alleyway with the lower end thereof spaced above the floor of said alleyway, a manure scraper movable along said alleyway and under said partition, said scraper including a longitudinally extending, elongated, electrically conducted member extending forwardly and rearwardly thereof, and a source of electrical energy, means to electrify the elongated member and the manure scraper as it passes underneath the partition, said means including a mounting support securable to said partition, current carrying means engaging the elongated member of the manure scraper as it passes under the partition, means mounting said current carrying means to said mounting support and electrically insulated therefrom and means operatively connecting said current carrying means to the source of electrical energy.

12. The device according to claim 11 in which said mounting support includes a mounting plate and means securing said mounting plate upon the partition for vertical adjustment relative thereto.

13. The device according to claim 12 in which said last mentioned means includes a vertically situated rod, clamp means engaging said rod and said partition, said rod being movable vertically within said clamp means.

14. The device according to claim 11 in which said current carrying means comprises a current carrying brush engaging the upper surface of the moving facility as it passes below the partition.

15. The device according to claim 12 in which said current carrying means comprises a current carrying brush engaging the upper surface of the moving facility as it passes below the partition.

16. The device according to claim 13 in which said current carrying means comprises a current carrying brush engaging the upper surface of the moving facility as it passes below the partition.

17. The device according to claim 14 which includes a pair of insulating blocks secured to said mounting plate, said brush including a horizontally situated bar, the ends of said bar engaging and being supported by said block, and electrically conducting wire bristles extending downwardly from said bar, and an electrical conductor operatively connected between the source of electrical energy and said bar.

18. The device according to claim 15 which includes a pair of insulating blocks secured to said mounting plate, said brush including a horizontally situated bar, the ends of said bar engaging and being supported by said block, and electrically conducting wire bristles extending downwardly from said bar, and an electrical conductor operatively connected between the source of electrical energy and said bar.

19. The device according to claim 16 which includes a pair of insulating blocks secured to said mounting plate, said brush including a horizontally situated bar, the ends of said bar engaging and being supported by said block, and electrically conducting wire bristles extending downwardly from said bar, and an electrical conductor operatively connected between the source of electrical energy and said bar.

20. The device according to claims 17, 18 or 19 in which said mounting plate comprises an inverted channel member, said blocks each comprising a substantially T-shaped member when viewed in end elevation with the upper horizontal portion thereof nesting within said channel and being secured therein, said blocks being secured in spaced relationship one from the other, the vertical portion of said T-shaped members being apertured to receive the ends of said bar of said brush.

* * * * *